United States Patent [19]
Pactong

[11] Patent Number: 6,018,712
[45] Date of Patent: Jan. 25, 2000

[54] METHOD AND APPARATUS FOR REMOTE PROGRAM EXECUTION TO USE IN COMPUTER SOFTWARE PROTECTION WITHOUT THE USE OF ENCRYPTION

[76] Inventor: Alberto Pactong, 1870 Dresden Dr. North-East, Apt. B12, Atlanta, Ga. 30319

[21] Appl. No.: 08/994,868

[22] Filed: Dec. 19, 1997

[51] Int. Cl.[7] .................................................. H04L 9/00
[52] U.S. Cl. ........................................ 705/1; 380/3; 380/4
[58] Field of Search .................................. 705/1; 380/4, 9, 380/25, 49, 3

[56] References Cited

U.S. PATENT DOCUMENTS

| | | | |
|---|---|---|---|
| 5,182,770 | 1/1993 | Medveczky et al. | 380/4 |
| 5,530,752 | 6/1996 | Rubin | 380/4 |
| 5,666,411 | 9/1997 | McCarty | 380/4 |
| 5,675,645 | 10/1997 | Schwartz et al. | 380/4 |
| 5,748,741 | 5/1998 | Johnson et al. | 380/28 |
| 5,754,647 | 5/1998 | Hsu | 380/4 |

*Primary Examiner*—James P. Trammell
*Assistant Examiner*—Demetra R. Smith

[57] ABSTRACT

A storage device, either a Cartridge (40) or a credit-card-like, capable of protecting the program stored inside it by physical measures and a security-logical-lock. Physical measures are anything, from tide seals to chemical substances, that physically protect the program. The security-logical-lock is a cartridge operation, performed by a processor chip —CPU (43)— in the cartridge that filters all jump-codes from the program. CPU (43) does this filtering while it is sending the program's code to Computer (10). CPU (43) will perform the program's jump-code by itself instead of Computer (10). Cartridge (40) connects with Computer (10) through a communication device, which comprises of a Device Card (20), a Device Port (30), or a combination of both. Device Card (20) and Device Port (30) are the link between Computer (10) and Cartridge (40) supporting linking services. They can also offer remote execution of programs and special implementations in the Internet, Intranet, and WWW environments.

11 Claims, 5 Drawing Sheets

METHOD AND APPARATUS FOR REMOTE PROGRAM EXECUTION TO USE IN COMPUTER SOFTWARE PROTECTION WITHOUT THE USE OF ENCRYPTION

1. BACKGROUND—FIELD OF THE INVENTION

This invention relates to the protection of computer software programs from illegal duplication by using hardware, processes, and remote execution.

2. BACKGROUND—PRIOR ART

The protection of computer software, up to now, has involved using a combination of techniques that comprise logical, physical, or both approaches. But all of them do not offer adequate software protection. Proof of this is that the average illegal-copies of software in the world is 66% (that is 66% of illegal copies against 34% of legal copies). Some places in the world even account for more than 90% (that is 90% of illegal copies against 10% of legal copies). These kinds of statistics are very discouraging for software developers and companies. Therefore, it is very important to find a better way to protect software programs without degrading computer performance.

2.1. Logical Techniques

Examples of logical techniques are:

Data encryption. Although this technique is not for software protection, some programs use it in combination with a decoding program to enforce the protection. The major pitfall of this technique is that if someone copies the decoding program illegally, the data encryption will fail to protect the software (and it is very easy to copy the decoding program).

This technique also makes computer software (or programs) run very slowly, since the computer must decode the program before executing it. It is also space-consuming because the coded data is usually larger than the original program's code.

'Bad sector' trick. Some software protection programs use some particularities of the operating system (and the general file managers on the market) to enforce software protection. One of these examples is the 'bad sector' trick. It involves taking advantage of the operating system and the general file manager programs which do not read the sector in the disk marked as bad. When the user copies a disk with the operating system (or file manager), it will not copy this bad sector's information, and the duplicated disk will have an incomplete program due to this.

Dedicated-copy-programs (copiers) can easily override the 'bad sector' technique, not only making a true image of the disk, but also copying the information of any bad sectors. We can find several copiers on the market, and some of them are free. One of the most popular copiers on the market is COPY II PC. This shows how weak this technique is for computer software protection.

Custom-designed disk driver. Some software protection techniques use hardware particularities to protect the software. One of these techniques is the 'custom-designed disk driver.' It involves designing a disk driver to use some particularities of the hardware toward their own advantage. One of the effects of this technique is that the operating system (and file managers) can not read this type of programs, making it harder to copy.

But you can use the same copier for the 'bad sector' trick to override this protection technique. The true image copy feature of these copiers can go through the senseless data because the copier does not worry if the information is valid or not. Copiers just make the copy as close as possible to the original program.

These types of logical protection techniques have proven ineffective for several reasons: (1) It is easy to create a copy program (copier) that makes a true image of the program stored in the disk. (2) Programs that you must load in the computer hard disk, because it is faster and easier to run the program from the hard disk, have also limitations in the protection technique. (3) They are also time-consuming since the program must go through several check points before its execution. (4) They are also space-consuming because the protection technique also occupies some storing space in the disk. (5) And, they are easy to override because you just need another program to override the protection without buying any special hardware.

A logical analysis of these techniques can deduce that any logical protection technique has a main pitfall: they are easy to override by another software (or logical technique) sooner or later.

2.2. Physical Techniques

Physical techniques for software protection are more difficult to override because they require special knowledge and specialized hardware. Among the physical techniques for software protection we have:

Nintendo game cartridge. The popular electronic game company Nintendo® developed a cartridge to store their programs that runs in their Nintendo® 16 and 32 bits' machines. This technique is quite effective in the protection of their software because no copy appears to have been produced yet. However, I did hear some rumor that you can find some illegal copies of Nintendo® games. The major pitfall of this technique is that computers do not have any device to read a cartridge. It is also easy to copy a program stored in the cartridge by transferring the data to another storing device. The cartridge design is not to protect the information inside it from illegal copying.

Laser-holed floppy disk. Because the techniques in section 2.1 (Logical techniques on page 1) were easy and cheap to override, people have come up with some physical techniques for software protection. One of these is the laser-holed floppy disk. This technique involves making several holes (not too many, say 10 is enough) with a laser, in various (random) places. The holes are too tiny to see with the naked eye, and the sectors where the holes lay are not readable and marked as 'bad sectors.' The difference with the 'bad sector' trick is that no information appears in these sectors. The original disk has a true bad sector that no one can read or write, but the illegally duplicated one has bad sectors that one can read and write.

To override this technique: one can use special hardware to duplicate the disk, with bad sectors included. One can also modify the program to reflect new conditions: say different bad sectors or no bad sectors at all.

A disadvantage of this technique is the time consumed to check the protection technique. The problem of storing the program in the computer's hard disk is that it needs the original program disk in one of the diskette drivers for checking. The laser tool is also expensive.

Intelligent card. The intelligent card's designer did not intend to use it for software protection, but to protect the data inside the card (for example, of a bank transaction). The relation of this design with my protection technique is that it uses a central processor unit (CPU) chip inside the card. However, the intelligent card can not work with a computer as a source of executed program. The pitfall of this card is that the information is easy to unlock with special hardware or programs. This is true because the only thing that it needs to override the protection is to give the correct number-password (and the card, of course) to unlock the information. Then, it is just a matter of time to find the correct password.

2.3. Conclusion

All these techniques have one thing in common: they have proven ineffective to protect (even adequately) programs from illegal copying, either because of their weak design or because they were not intended to do so. All of them are time-consuming and space-consuming techniques. Sometimes, when an innovative software protection technique appears, the counterfeiters develop a counteraction so fast that the cost of the protection technique is not justifiable. In sum, the above techniques have one or more of the following disadvantages:

(a) The software protection level is poor, giving an effectiveness of less than 50%.

(b) The time used to check the protective measures adds up to the program execution time, giving a high loading time for programs.

(c) Some of the custom disk drivers have a slower performance than the default operating system, and this gives a slower execution time for programs.

(d) They need additional storing space in the disk for the part of the program that checks the protective measures and storing space for the measures themselves.

(e) Complex programs that are huge by themselves need to be loaded in the hard disk to ease their execution. They can not take advantage of these protective techniques since it will make them less user-friendly.

(f) Complex programs also need large storing space in the hard disk to store themselves.

(g) The costs paid for these ineffective protection techniques are too high for an inferior product in return.

(h) They fail to protect a program in the Internet, especially if someone downloads the program from the net.

(i) The current protection techniques limit the program's scope.

3. OBJECTS AND ADVANTAGES

Accordingly, several objects and advantages of the protection technique are:

(a) To provide a superior software protection technique in comparison to the existing techniques.

(b) To provide a faster loading time for programs without sacrificing the security of the protection technique.

(c) To provide a protection technique that uses the default operating system, and therefore, simplifies the program's execution time and processes.

(d) To provide an independent storing place for the program, so that the program and the protective technique will consume less storing space in the host computer.

(e) To provide a run-time storing place for the program, so that the computer runs the program directly. This will relief the computer from loading the program into the hard disk. Therefore, more storing space is available in the hard disk for the program.

(f) To provide a choice for complex programs to keep their user-friendly features without sacrificing the security of the protective technique.

(g) To provide a protection technique that will give a better gain-cost ratio by reducing the illegal copies on the market for a longer time.

(h) To provide a protection technique that will work in the Internet and a remote execution, thanks to the remote-execution feature of this technique.

(i) To provide an additional multitask capability for programs.

(j) To provide a broader use of programs, making the protection technique an addition rather than a limitation for programs, and yet, giving programs new ways of performance.

(k) To provide more resources to the existing computer by just connecting the cartridge to the computer.

Therefore, the cartridge will consume less computer's resource, and it will increase the existing resource, providing its own storing place for its program codes and data.

Further objects and advantages will become apparent from a consideration of the drawing and ensuing description.

4. DRAWINGS FIGURES

The drawings herewith show a general outline (representation) of the hardware and interconnections (FIGS. 1 to 6), and a flow chart of the cartridge's main function (FIG. 7). The reference numerals are at the bottom right corner of each box or the lower corner of each rhombus, Thick lines connecting elements are communication lines.

5. LIST OF REFERENCE NUMERALS IN DRAWINGS

Figure 1:
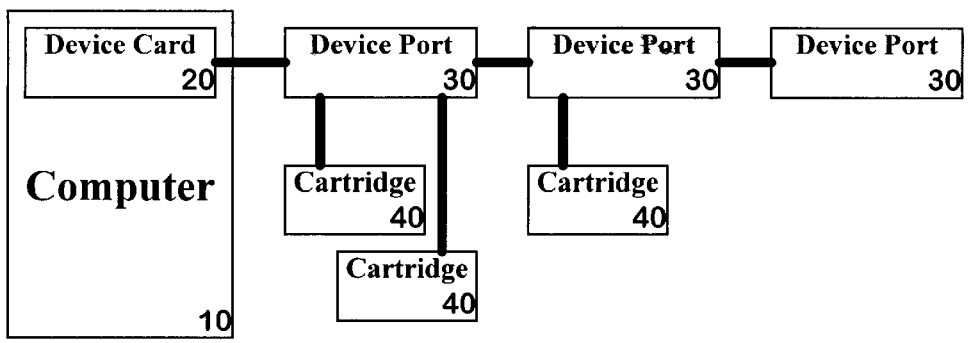
FIG. 1 shows a general outline of all the hardware involved and the connections.

Here is a list of all reference numerals that appear in the drawings. I avoid the use of connecting lines between the reference numeral and the element to simplify view. The reference numerals are at the bottom right corner of the box (or lower corner of the rhombus If-box in FIG. 7).

| | |
|---|---|
| 10 | computer |
| 11 | power lines |
| 12 | clock line |
| 13 | interrupt line |
| 14 | code lines |
| 15 | data 1 lines |
| 16 | data 2 lines |

-continued

| | |
|---|---|
| 17 | flags lines |
| 18 | computer-device-card connector |
| 20 | device card |
| 21 | device card central-processor-unit |
| 22 | device card ROM |
| 23 | device card RAM |
| 24 | current-port-number register |
| 25 | first-serial-number register |
| 26 | current-port lines |
| 27 | serial-number lines |
| 28 | device-card-device-port output connector |
| 30 | device port |
| 31 | device-card-device-port input connector |
| 32 | device-port-device-port output connector |
| 33 | adder |
| 34 | XOR chip |
| 35 | NOR chip |
| 36 | multiplexer |
| 37 | multiplexer selector input |
| 38 | multiplexer data input (one line) |
| 39 | multiplexer output (several lines) |
| 40 | cartridge |
| 41 | port |
| 42 | port enable input |
| 43 | cartridge central-processor-unit |
| 44 | instruction-pointer register |
| 45 | fixed memory |
| 46 | cartridge RAM |
| 50, 51, 52, and 53 are IF-boxes | |
| 54, 55, 56, 57, and 58 are instruction boxes | |

6. SUMMARY OF THE INVENTION

In accordance with the present patent application, the invention comprises a cartridge and related hardware (such as device card, device ports, and computer) to perform a software program protection technique with a remote type of execution and a 'security logical lock.'

7. DESCRIPTION—STATIC ELEMENTS

FIG. 1 shows a typical embodiment of the hardware. A Computer 10 holds inside it a Device Card 20 connected to a computer card slot (obviated from the figure). Device Card 20 connects to a first Device Port 30, and this first Device Port can connect, in line, to more Device Ports. Each Device Port can connect to one or more Cartridges 40 through its Ports (Port 41 is hidden in this FIG., but it appears in FIGS. 4, 5 and 6).

Figure 2:
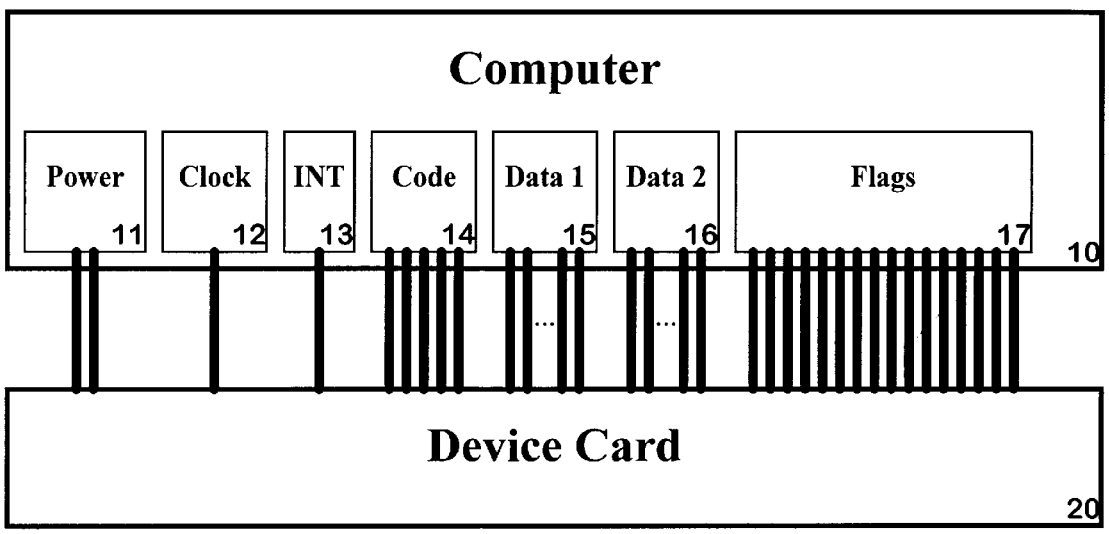
FIG. 2 shows the individual connection lines between the Computer and the Device Card.

FIG. 2 shows the computer connections with the Device Card. The connections are communication lines from several elements of the computer. These elements comprise:

a Power 11 of two lines, one positive and one negative, a Clock 12 line, an interrupt 13 line (INT), a Code 14 of 5 lines, Data 1 (15) lines, Data 2 (16) lines, and Flags 17 lines.

The name of these lines indicates the computer's elements with which they communicate. The power lines supply to devices and cartridges the electric energy needed to function. The clock line synchronizes the computer's operation with the rest of the hardware. The interrupt line is a designated-hardware-interrupt from the computer, to supply interrupt-services to the rest of hardware. The code-lines send instructions from the computer to the rest of the hardware. The data 1 and data 2 lines are data communication lines. All information in the hardware passes through these lines. The flags-lines supply information about the computer flags' status to all cartridges. These communication lines join together in a computer's slot (a Computer-Device-Card Connector 18, in FIG. 3).

Figure 3:
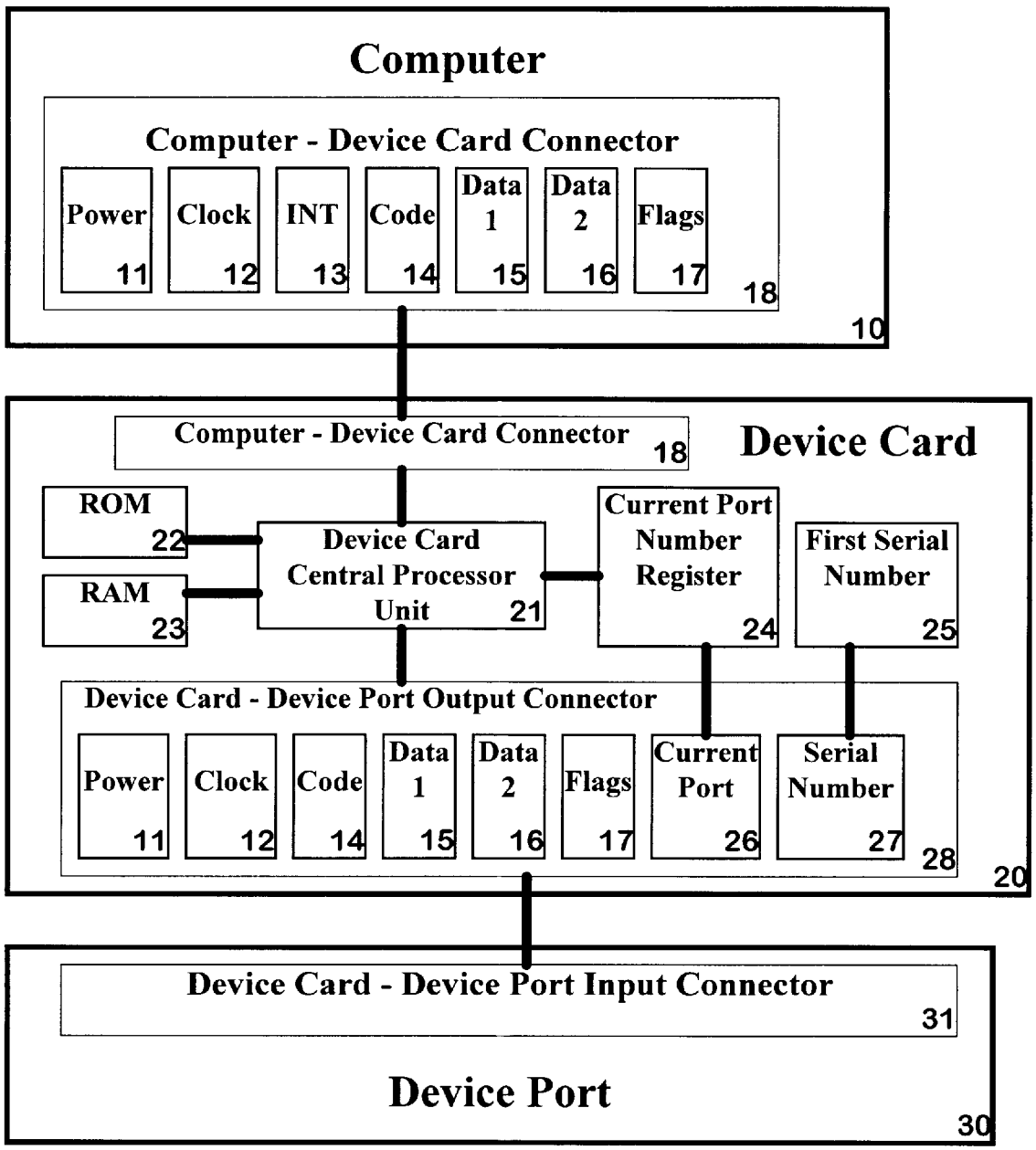
FIG. 3 shows a view of the elements that comprise a Device Card and the interconnections between the outlined elements of Computer, Device Card and Device Port.

FIG. 3 shows the general outline of the elements that comprise Device Card 20. One of the elements is the same Connector 18 described in the computer (see above). Then, there is a central processor unit 21 (CPU) that has access to a ROM 22 (Read-Only-Memory) and a RAM 23 (Random-Access-Memory) for fixed programming and operational memory respectively. The device also has a Current-Port-Number Register 24 to save the active current port (set by the device-card's CPU), and a First-Serial-Number 25, which represents the number zero. The Register 24 feeds directly to a Current-Port 26, and First-Serial-Number feeds directly to a Serial-Number 27.

The current-port lines and serial-number lines join the connection lines of Connector 18 to form a Device-Card-Device-Port Output Connector 28 (but note that INT 13 is unnecessary here). Connector 28 connects the device card to a first Device Port 30, by a Device-Card-Device-Port Input Connector 31 inside the device port.

Figure 4:
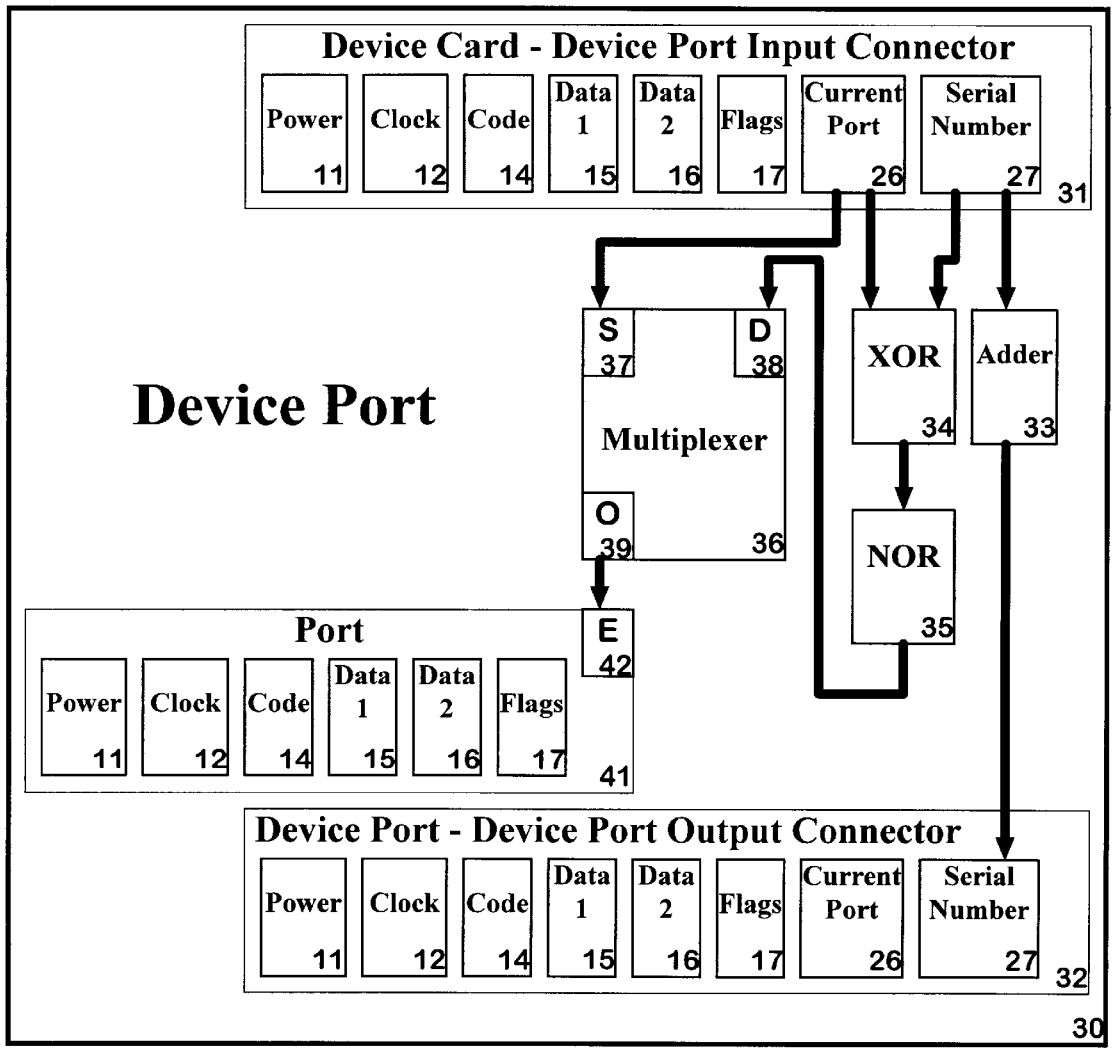
FIG. 4 shows the elements that comprise a Device Port.

FIG. 4 shows the elements in the device port. This device port could be the first one connected to the device card or any other device port in line, since they are all the same. All device ports can interchange with each other in the line without affecting their performance. Serial-Number 27 in Connector 31 goes to an Adder 33, which adds one to this input number before passing over to the Serial-Number 27 of a Device-Port-Device-Port Output Connector 32. This Output Connector 32 connects to the next device port in line. Serial-Number 27 of Input Connector 31 also sends the original number to a XOR chip 34. Current-Port 26 of Input Connector 31 also feeds its data to the XOR chip. This XOR chip does a bit-to-bit XOR operation (exclusive OR) on its input parameters. The result then goes to a NOR chip 35, which does a Not-OR operation. This result feeds in a Data Input 38 of a Multiplexer 36. The same data in Current-Port 26 of Connector 31 feed into the multiplexer's Selector Input 37 to generate an Output 39 from the multiplexer. Output 39 consists of several lines (say 8 lines), and each goes to one, and only one, Port 41. Each Output 39 feeds a port's Enable-Input 42, and the multiplexer will activate only one port, the correct one. Port 41 has a subset of the connecting lines of Connector 31. They are power, clock, code, data 1, data 2, and flags lines. While Output Connector 32 connects with the next device port, each Port 41 connects the device port with one cartridge (see FIG. 5).

Figure 5:
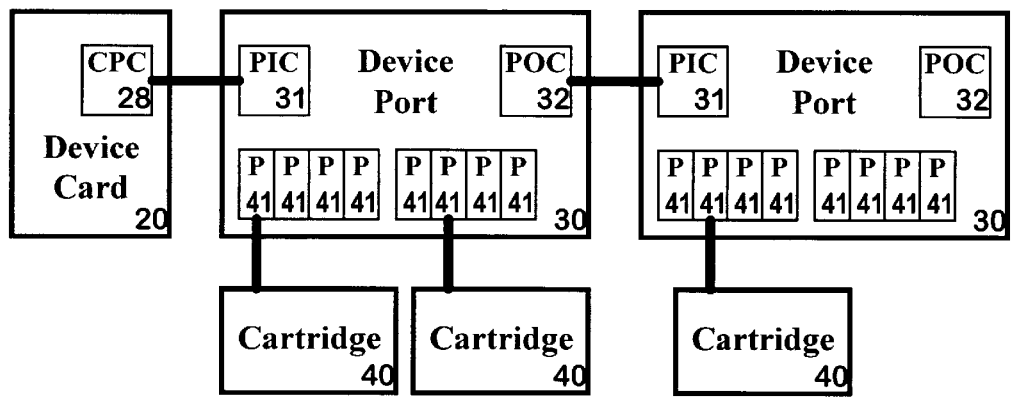
FIG. 5 shows a more detailed outline than FIG. 1 of the interconnections of the elements of the Device Card, Device Ports and Cartridges, showing the interconnections of their elements.

FIG. 5 shows how the elements in the device card, device ports, and cartridges connect to each other. The device card's Connector 28 connects to the first device port by its Input Connector 31. A next device port can connect to the previous one by connecting its Input Connector 31 with the Output Connector 32 of the previous device port. Each device port has a limited (pre-designed) number of Ports 41. Only one cartridge can connect to one of these ports in any of the device ports in the line. The order of connection in the line determines the order of the device ports. The first device port is the first one connected to the device card; the second device port is the one connected to the first device port, etc.

Figure 6:
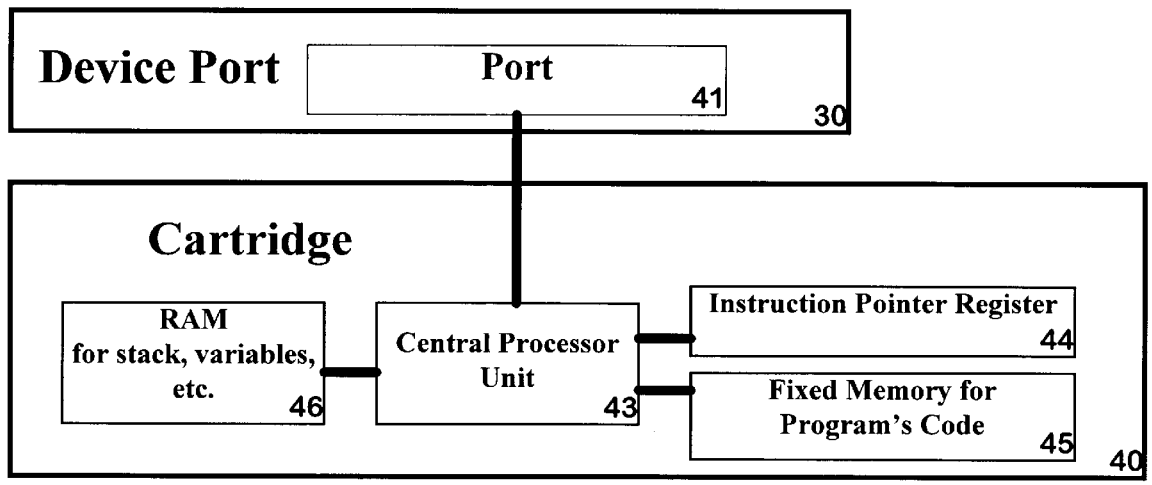
FIG. 6 shows the elements of the Cartridge and their interconnections with the Device Port.

FIG. 6 shows the elements in a Cartridge 40. The cartridge has a central processor unit 43 (CPU) that receives all the connection lines from Port 41 of the device port. CPU 43 has also connections with an Instruction Pointer Register 44 that serves to save the current instruction pointer value. CPU 43 has also connections with a Fixed Memory 45 that provides the storage for the program. It has also connection with a RAM 46 (Random-Access-Memory) that provides storage for stack, data, variables, etc.

Figure 7:
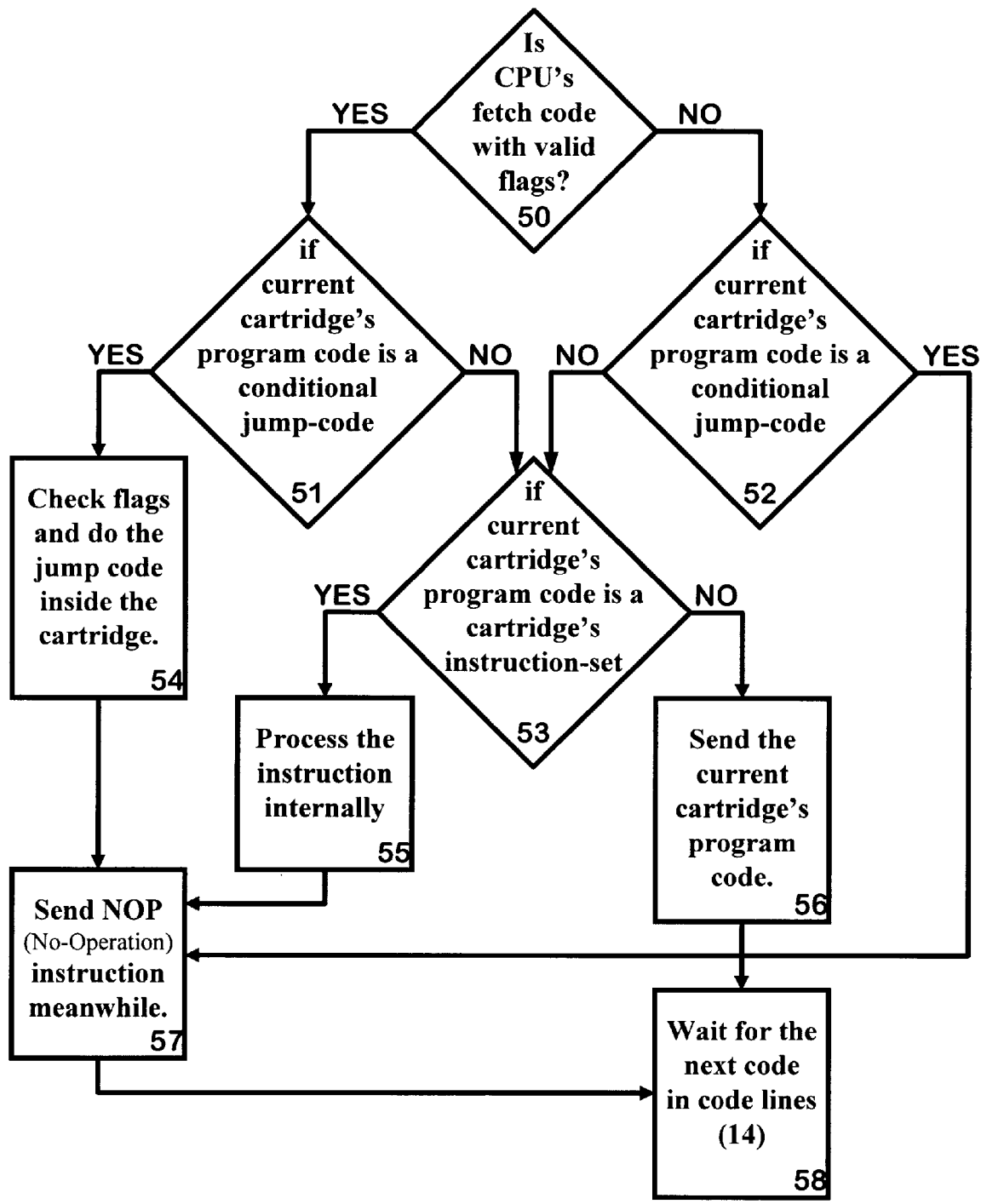
FIG. 7 shows a flow chart of the Cartridge's main function.

FIG. 7 shows a flow chart of the cartridge main function: the 'security logical lock.' Rhombuses marked with reference numerals 50, 51, 52, and 53 represent conditional boxes, while boxes with numbers 54, 55, 56, 57, and 58 are instruction boxes. The explanation of this figure and the others are in the following section (see section 8.4.2, The Cartridge's CPU instruction set, on page 18).

This type of arrangement helps keep a high versatility at a low cost. However, other arrangements can exist. For instance, it is possible to design a unique device port fused to the device card, so that they form a single hardware. This solution will cut off some elements, such as the serial-number (elements 25 and 27), XOR chip 34, and NOR chip 35. Another arrangement could be a device port of 16 Ports (41) instead of 8. All these ramifications are possible as long as the functionality of the hardware is intact.

The hardware's functionality is to keep the program safe inside the cartridge and to support communication between the computer and several cartridges. This functionality represents the physical security.

The cartridge will support the 'security logical lock,' but it must also give physical security to the program inside it. Physical security is in the order of physical means that the cartridge will offer so that a physical attempt to get the program is very unlikely to succeed. One way to do this physical security is to cover the cartridge with a strong-fragile substance (such as ceramic), so that a break to this substance will also destroy the program inside the cartridge. A good idea is to have variable arrangements of the elements inside the cartridge, so that people will have a hard time searching for the elements. Although I was mentioning a 'cartridge' as the recipient of the program, the ultimate goal is to replace the cartridge with a credit-card-like container.

As it becomes evident from the description above, we can deduce the following advantages:

(a) The hardware, by itself, will provide adequate physical protection for the program, similar to section 2.2 Physical techniques on page 2.

(b) Since the program will stay in the cartridge, no loading time will occur.

(c) The program will use less storing space in the computer. We can see that each cartridge will increase the available computer's resource because it will be like adding more memory to the computer with each cartridge.

(d) Complex programs can keep their user-friendly features without sacrificing security.

(e) The cost of this hardware is low. The elements mentioned above are all available in the market or can be built without incurring in high costs.

(f) This arrangement has the remote execution feature because the cartridge communicates with the computer through a device port and device card. We can replace the device port with a modem, or connect one of its ports with a modem, and we will get a remote execution from the Internet.

(g) Since the cartridge has its own instruction pointer, multitask execution is a lot easier to implement.

8. OPERATION—FUNCTIONALITY OF HARDWARE

The hardware's job is to protect the program from any physical attempt to reach the program's source code. This protection will be completed with the 'security logical lock' that the cartridge performs.

The 'security logical lock' is a procedure that involves returning all codes in the program except jump-codes. The cartridge will process all jump-codes in the program. When the computer sends a fetch code, it will receive only non-jump-codes from the cartridge's program. This is the 'security logical lock.'

In order to implement this 'security logical lock,' we have to make some changes to the existing computer hardware. The user will perceive these changes as a hardware upgrade. Old software and hardware will still work with this new computer. Even programming software will be the same. In fact, little has changed, except that there is a new hardware for the cartridge. This is different from the previous software protection technique because this technique will work in the same old fashion way without limitations, yet accomplishing new programming alternatives (such as remote execution).

Next, I will describe a detailed functionality of the parts of the hardware.

8.1. Computer-Central Processor Unit (CPU)

The computer will be the same, but its CPU will need some additional instructions. The old instruction-set will be kept equal, and the new instruction-set will be like an upgrade. In addition to this, there is an extra-register, called 'current cartridge-register' (CCR—to differentiate from Current Port Register 24), that will store the active cartridge represented by its port number.

See FIG. 2 for reference. Power (11) lines connect the computer's main power source to the rest of the hardware. Clock (12) line connects the computer clock device with the rest of the hardware to synchronize their operation. I will explain the INT (13) and Code (14) lines in the next section. In this section I will concentrate on the CPU instruction-set.

The new instructions are:

1) Fetch with flags. The CPU generates this instruction to the current active cartridge to retrieve the next program's code. The computer transmits the fetch-with-flags instruction through Code (14), and a valid flags' status in Flags (17). It expects the program's current code in Data 2 (16). In the final structure of the hardware, we can consider transmitting the flags in Data 1 (15), eliminating Flags (17). This is, anyway, the only instruction and the only moment that we use Flags (17).

In accordance with the 'security logical lock,' the returned program's code will be a no-jump-code. When the cartridge needs some time to process the jump code, it will return No-Operation (NOP) as the program's code. The returned program's code can be in any size configuration, say 1, 2, 4, or 8 byte size. The bigger the size, the faster the program will run.

2) Fetch without flags. This instruction is for the type of CPU that can fetch program's codes in advance. The flags' value might not be valid, therefore, this fetch is without flags. The CPU sends the instruction in Code (14)

and expects the program's code returned in Data 2 (16). As in the previous instruction, the CPU expects no-jump-codes, and at a reasonable size. If the current program's code is a conditional jump-code that needs the flags' value, the cartridge returns NOP-codes until the CPU sends the fetch-with-flag instruction.

Some CPUs have the capability to fetch program's codes in advance. Usually the CPU issues a fetch when it finishes processing the current program's code and needs another program's code. While fetching in advance, the CPU can fetch program's code before finishing the processing of the current program's code. This saves time. When doing so, the CPU will not have a valid flag for the cartridge, and here is when the fetch without flags is necessary. The CPU can issue back a fetch with flag when it finishes processing all the program's code in the queue.

3) Execute cartridge. The CPU needs an execute-cartridge instruction to have a way to execute the cartridge's programs. This instruction starts the cartridge's program execution. This is setting the cartridge's Instruction-Pointer Register (44), see FIG. 6, to the beginning of the program (usually zero), and setting the CCR to the port number of the cartridge. This instruction will have a parameter that represents the port number of the cartridge that wants to execute in Data 1 (15). Then, the CPU enters in cartridge execution mode, sending fetching instructions to the current cartridge.

For example, execute cartridge 2 means to execute the cartridge in port number 2. This will set CCR to 2, set port 2 cartridge's instruction-pointer to zero, and send fetch-instructions to cartridge 2.

A port number zero will mean that the CPU is not in cartridge execution mode, but in memory execution mode. The CPU will reference the cartridge ports beginning with port number one.

4) Subroutine calls. Subroutine instructions are CALL and RET (return). They will have some modifications, but old software will remain equal. This is true because CALL and RET affect only the local computer. This means that these instructions, which are common to all programs, can actually behave differently from one computer to another without any side effect to the program. CALL and RET are flow control instructions.

When the program issues a CALL statement, the CPU usually stores the current address in the stack so that the CPU can return to this address later. Now we need, besides the current address, an extra byte before which will identify if the return address is in the computer memory or if it is a particular cartridge port. The byte will be zero if the return address is in the computer memory. It will be one if the return address indicates the cartridge port number to return to. Other values are possible. The word or byte following this first byte corresponds to the address in the computer memory (word) that it should return, or the cartridge port (byte) that the CPU will return. Then, the RET instruction will process this information following these considerations. All the previous instructions are essential for the CPU. Fetch-instructions (1 and 2) are out of the CPU instruction-set. The CPU generates these instructions internally when it needs them. The other instructions are part of the CPU instruction-set and can appear in a program's code.

There are some less essential instructions, but it will be good to have them because they help to ease the computing job, and because they add more feature to the computer. These instructions are:

5) Cartridge memory access—segment override. This instruction is like a segment override instruction found in the Intel® CPU instruction-set. This will indicate that the following address is in a given cartridge. This instruction helps programs have access to data stored in a particular cartridge.

6) Cartridge move. This instruction moves data from the cartridge to the computer's memory (RAM). The cartridge sets the data address in the cartridge in the same way it filters the jump-codes. The program's codes set the data address in the computer. When the cartridge sends this instruction in a fetch-instruction (see above, instructions 1 and 2), with a parameter that indicates the number of bytes in the transmission, the CPU will store the next number of bytes in the memory. It also can define a cartridge that is different from the current one. In this case, the computer must change the active cartridge before moving the data.

7) Cartridge store. This instruction moves data from the computer's memory to the cartridge. This is as long as the cartridge is capable of storing data. It also can define a cartridge that is different from the current one.

8) Additional macro instructions. Some macro instructions in the CPU, such as LOOP, can be important enough to implement a cartridge version of them. In the case of LOOP, we can split the instruction into two parts. One part does all the things that LOOP does before the jump (and call it CLOOP), and the other is the jump-code. CLOOP will be the cartridge version of the macro instruction, and it decrements the register plus doing a register comparison. CLOOP plus a conditional jump-code will be the replacement for the original macro instruction.

We might need a way to link the cartridge port number to the cartridge program's name. This way we can execute the cartridge program either by its name or by its port number.

8.1.1. Computer's ROM

The computer's ROM (Read-Only-Memory) will also have new functions and some modified functions to support the new hardware. Some of those modifications are:

1. The system start-up procedure. We must include in the system start-up procedure an additional check for the new hardware (the device card), usually at the end of the normal checking. It also must gather information from the cartridge, such as the program's name, etc. Additionally, the computer's operating system can be in a cartridge instead of drive A or hard disk. The ROM must check this too after failing to find the operating system in the standard places. Note that port zero is used for other purposes, the operating system is in port one, and that this port one in the computer is port zero in the device card.
2. The loading procedure must include the ability to execute a program from the cartridge.
3. It would be ideal to be able to run a cartridge program by typing its name instead of the port number.
4. We will need a whole set of new functions to support cartridges. For example, we might have: execute cartridge program, report program's name, get total number of connected cartridges, set current port, get port's status, etc.

8.2. Device Card

The device card is the link between the computer and the cartridges. It will be in charge of processing some of the CPU's commands and providing some cartridge's services. FIG. 3 shows the elements that comprise a device card, and FIG. 4 shows the device port's elements.

First-Serial-Number (25) is just a zero number, and it will start the order of the device ports. This number will set the device port attached to the device card as the first device port. Current-Port-Number Register (24) will store the current active cartridge. Since port number-zero is used by the CPU for other purposes, Register (24) will have the CPU-CCR's value minus one. If CCR is zero, Register (24) will have −1 (i.e., all one, this is one way to represent −1 in computers).

The maximum number of ports supported depends on the physical capabilities of the computer and the device card. Elements such as energy consumption or physical space will play a great role in deciding this number. A suggested maximum number of ports is 255. Port number zero is for CPU's memory execution, and port 1 will be number zero in device Register (24). This way the computer will take the full range of 0–255 in its CCR register, but the device card will operate in the range of 0–254. That totals 255 ports, grouped in 8 ports per device port.

The device card's CPU (21) will process the information coming from the computer. This information is mainly the codes that the computer transmits through Code (14). These code-lines comprise of five lines because there are less than 32 different codes (there are 17 codes). Code (14) represents a binary code, where each line is a binary number. We can classify these codes in the cartridge's codes and the device's codes.

The cartridge's codes are:
00000 No code.
00001 Fetch with flags. The CPU asks the cartridge to send the current program's code(s) and set the instruction pointer to the next program's code. Fetched program's code is in Data 2 (16). The CPU also sends a valid flag value. Flags are in Data 1 (15) instead of Flags (17), because only this code uses Flags (17), and no other code uses these lines. I drew Flags (17) to remember the importance of these lines.
00010 Fetch without flags. The CPU asks the cartridge to send the current program's code, but there is no valid flags-value. The cartridge should send NOP (No-Operation) code(s) if a conditional jump-code (which needs a valid flags-value) is the current program's code. Fetched code is in Data 2 (16).
00011 Start program. The CPU sends this code when a program should run from the start. The cartridge's CPU (43) sets Instruction Pointer Register (44) to zero, and returns an error message in Data 2 (16). An optional parameter code can appear in Data 1 (15).
00100 Report memory. This code will report the contents of the cartridge memory at the address given in Data 1 (15). The cartridge reports the data at Data 2 (16). The data stored in this memory are data or global variables.
00101 Store memory. This code will tell the cartridge to store the information in Data 2 (16) in the cartridge, at the address given in Data 1 (15).
01000 Are you there? The device card sends this code to ask a cartridge to acknowledge its presence. Data 1 (15) and Data 2 (16) are all ones.
01001 Set CPU speed and computer type. The device card sends this code to each cartridge to ask it to store the data. The CPU speed is in Data 1 (15), and the computer type is in Data 2 (16).
01010 Report initial part of program's name. The program's name can be up to 32 characters. The cartridge will report the first 4 characters in Data 2 (16), if we use a 32-bit data line.
01011 Report next part of program's name. This code tells the cartridge to report the next part (4 characters) of the program's name in Data 2 (16). The CPU should issue this code several times until the cartridge reports the entire program's name (i.e., 7 times).

The device codes are:
00000 No code.
10001 Set current port. This code sets Register (24) to the port number given at Data 1 (15) as the current port. The current-active-port (if any) will set to standby. The number given in Data 1 (15) is CCR's minus one.
10010 Report number of cartridges. The device card will report the number of cartridges currently present and connected in Data 2 (16).
10011 Report interrupt. The CPU generates this code in response to a hardware interrupt, generated before by the device card, in order to find out what is going on at that moment. This can be due to an error or because the recent connection of a cartridge.
1000 Are you there? The CPU asks the device card to acknowledge its presence. Data 1 (15) and Data 2 (16) all ones.
11001 Set CPU speed and computer type. The computer asks the device card to save these data. The CPU speed is in Data 1 (15) and the computer type is in Data 2 (16).
11010 Report first cartridge's port number. The device card will report the first port number occupied by a cartridge in Data 2 (16).
11011 Report next cartridge's port number. The device card will report the next port number occupied by a cartridge in Data 2 (16).

8.2.1. Device Card Operation

The device card's job is to keep the link between the computer and the cartridges and to give services to both of them. The device's operation can be of two types: the start-up operation and the sentinel operation. Any other operations are improvements to these basic operations and are ramifications to the basic idea.

8.2.1.1. The Start-Up Operation

This operation happens when someone turns on the computer. It is also the moment in which the device card turns on too. At this moment the device card does some housekeeping work before the computer can use any cartridge.

1. The device card will check the number of cartridges connected to the device by sending the acknowledge code (01000) to each port. The connected cartridges will respond to this command. The device will determine the number of cartridges connected, save this number in a variable or register, and set Register (24) to zero. This is a disconnected and independent activity, so that the device card will work in parallel with the CPU. If the CPU sends any code (in Code 14) the device will respond the following way:
00000: No code. The device will continue its job.
00001–01111: All cartridge codes. The device will generate an interrupt through INT (13) to report a Not-Ready error.
10011: Report interrupt. If an error (Not-Ready) occurred, report it; otherwise report No-Error.
11000: Acknowledge. The device card will acknowledge with Data 1 (15) and Data 2 (16) all bits set to one.
11001: Set CPU speed and computer type. The device card will store the given information for later use.
1xxxx: All other device codes. The device will generate an interrupt through INT (13) to report a Not-Ready error.
2. When the device card finishes the previous activity, it will wait for the CPU to generate the acknowledge (11000) and the 'set CPU speed and computer type' (11001) codes. If the CPU has already generated these codes, the device card will move on to the next activity. Meanwhile, when the device card is waiting for these codes, it will generate the same error-codes in the previous activity.

3. After finishing the previous activities, the device card will set the CPU speed and computer type to each connected cartridge (if any) using code 01001. When this activity is in process, the device card will generate the same error-codes as in activity 1 above. When the device finishes this activity, the device will enable all codes that the CPU will send to the connected cartridges.

8.2.1.2. The Sentinel Operation

The device card performs this operation after finishing the start-up operation. This operation is more like a background operation. Any cartridge code (codes 00001 to 01111) and the 'set current port' code (10001) to a free port will generate a Cartridge-Does-Not-Exist error. A free port is a port with no cartridge connected to it. The device card will report this error, and any other error, through INT (13) if no other way is possible.

Meanwhile, the device card will check all free ports to see if someone inserts a cartridge. When someone connects a cartridge to a Port (41), the device card will consider this port a free port until it sets the CPU speed and the computer type in the cartridge. If no error occurred in this operation, the cartridge will enable the cartridge port and will send an interrupt to the CPU to inform the new cartridge.

If someone disconnects a cartridge from a port, the device card must report the disconnection to the CPU, and set the port as a free port. The device card can check all inactive cartridges by sending the acknowledge code (01000) to them. The device card will assume a disconnection if the cartridge does not respond. The computer should check the active cartridge for disconnection. If the cartridge is responding with NOP for quite a while, then the computer must send the acknowledge code (01000) to check if the cartridge is still in the port.

8.2.1.3. Other Device Card Operations

Some device codes need more explanation.

When the CPU sends a set-current-port code (10001), the device card will set the given port as the current port, throwing the current active cartridge to standby. If the given port number is a free port, then the device will generate a Cartridge-Does-Not-Exist error in Data 1 (15).

When the CPU sends a report-number-of-cartridges code (10010), the device card must report the total number of cartridges connected to the device at that moment. The reported number is in Data 2 (16).

8.3. Device Port

I have designed the device port as an expandable device, so that anyone can add more ports to the existing device whenever they need. However, it is possible to design a device that has the device port and the device card together in one single device. It can still have the expansion feature by leaving Connector (32) in the device, and the device card will have the first device port already inside it. The modification will be that Serial Number (27) will send number 1 instead of zero. See FIG. 4 for reference.

The device port will physically connect the cartridges to the computer. It has the connection lines (also called circuit). The device port will have some elements that will help it define the active port. The active port will receive all cartridge codes sent by the CPU. The active port will be the one that is in operation at that moment. The CPU will work with one cartridge at a time.

Serial Number (27) will tell the order of the device ports connected in the line. The first device port connected to the device card will receive a number zero, which means that it is the first device port. This serial number will go to an Adder (33) which adds one to this number. Then, the second device port will receive number one as the input serial number. Following the same reasoning we will find that the third device port will receive number 2, etc. This serial number will decide if the port number in Current Port (26) is in the current device port. The first device port will have ports 0–7, if we are talking about an 8-port Device-Port. The second device will have ports 8–15, etc.

Current Port (26) is an 8 bit number because I suggested a number of 255 as the maximum number of ports above. A change to this maximum number of ports will also change the number of bits in Current Port (26). Any change to these specifications is possible if one can understand the whole technique described here with this example. With an 8-port device type of design, only the 3 less-significant bits in Current Port (26) will define the port number (port ID) in the device port. The 5 most-significant bits will give the device port number (device-port ID) in line, as a result, with zero for the first device port, one for the second, etc. A 16-port device will have the 4 less-significant bits as the port ID number, and the 4 most-significant bits as the device-port ID number. A 32-port device will have the 5 less-significant bits as the port ID and the 3 most-significant bits as the device-port ID. A 255-port device can obviate a device-port ID.

Serial Number (27) is the device-port ID. That is why it consists of 5 bits with an 8-port device, or 4 bits with a 16-port device, or 3 bits with a 32-port device, etc. A 255-port device can obviate a serial number.

XOR (34) and NOR (35) chips will decide if this device port holds the asked port. One of XOR-chip's input is the input Serial Number (27) in Connector (31), and the other input is the device-port ID in Current Port (26). In an 8-ports' device port, the device-port ID in Current Port (26) is the 5 most-significant bits. The XOR chip will perform a XOR operation to each corresponding bit in these two inputs (less-significant with less-significant, etc.). The result is a 5-bit number. The NOR chip will perform a NOR operation to this result, giving a one-bit final result. This final result is the one going in the Data Input (38) of Multiplexer (36). If a device-port ID in Current Port (26) matches the device port order (and serial number defines this), the XOR operation will give a zero number. It will give non-zero with no match. This result, passing through the NOR operation will give one with a match and zero with a no match. This final result represents the enable line for each port in the device port.

The multiplexer will select finally the actual port. The NOR chip output will disable all ports in the device port if its output is zero. An output of one will pass a final decision to the multiplexer. Only the port ID of Current Port (26) will enter the Select (37) input of the multiplexer, that is the 3 less-significant bits. Select (37) will he multiplexer decide which port will receive the enable data from NOR chip. And that is how the device port operates!

A 255-port device can eliminate Serial Number (27), Adder (33), XOR (34) chip and NOR (36) chip. A different number of ports in each device port will modify the capacity of the elements mentioned at the beginning of this paragraph. The device port must have a 2-power-n type of number of ports ($2^n$), that is 2, 4, 8, 16, etc. Any number in between will cause serious managing problems, but they are solvable.

8.4. Cartridge

The cartridge is the final element in the chain. Its physical structure must provide physical security to the information stored inside. Inside, its elements must comply with the 'security logical lock.'

The physical structure of a typical cartridge must be strong enough to prevent physical access to the inside elements. If someone gains access to the inside, the cartridge must destroy the data automatically. One way to achieve this is to seal the cartridge elements with a strong substance, and when someone tries to break the seal, the whole thing will break into pieces. Another suggested idea is to seal the internal parts with a chemical substance which upon coming into contact with air will destroy the internal parts. An additional security feature is to put the internal elements in a random position, in such way that the thief will not know where is safe to cut.

Besides the physical security, the 'security logical lock' is a very important complement for the complete security system. The 'security logical lock' is a procedure that involves processing all jump-codes internally by the cartridge. All program codes that the cartridge will return to the computer are no-jump-codes (all codes but jump-codes). Jump-codes are all conditional and unconditional jumps plus subroutine calls and returns, and any program's code related address.

The cartridge's CPU (43), see FIG. 6, will filter all jump-codes before handing over the no-jump-codes to the CPU. The cartridge has its own Instruction Pointer Register (44) to carry out this task. The cartridge will filter all jump-codes and do the jump itself internally, using Pointer (44) to keep track of the program. It also uses a RAM (46) to maintain its own stack to store the return address in a subroutine call. The program's code will be in a Fixed Memory (45), which can also hold any fixed data, such as the program's name, the program's help data, etc. Variables and other run-time data can use RAM (46) for their storage.

An easy way to filter jump-codes is to add one bit to each byte of the program's code stored in the cartridge. This bit will be set (one) when the byte is a jump-code, and clear (zero) when the byte is not a jump-code. If the original byte is an 8-bit byte, this additional bit will convert it into a 9-bit byte. We can use also a word-type of program-code which has two bytes per code instead of one. This will help reduce space consumption, giving a 17-bit word, instead of a 16-bit word of the original word, and instead of the 18-bit per two bytes above. It also works for a 4-byte code.

Effectively, we see that the cartridge will hide the program's code address to outside people, even the CPU. This is similar to have a 'black-box' as a cartridge, where no one knows what is inside the cartridge or how to get them.

8.4.1. Cartridge Codes in Operation

The codes that the CPU sends to the cartridge in Code (14) are summarized above, at the beginning of section 8.2, Device Card, on page 11. Please see that section for reference. I will describe here some of the meaning of those codes in an operational context.

Code 01001 (set CPU speed and computer type) can be slightly different from the way described previously. Depending on the approach, it could be better for the computer to receive the cartridge's speed and send the computer type. This way, the computer will add some time waiting when the cartridge is slower than the CPU. Time waiting is a term for additional clock ticks the CPU waits to communicate with a slow device. All these kinds of variations has little effect to the main cartridge's function: to protect the program from illegal copying.

8.4.1.1. When the Computer is Off

At the beginning, when you turn on the computer with a Cartridge (40) connected to a Port (41), the device card will be the first to communicate with the cartridge, through a device port.

The device card will send the acknowledge code (01000) first, then the 'set CPU speed and computer type' code (01001). The first one will ask for the acknowledgment of the cartridge's presence in the system. The second one will ask the cartridge to save the information given in its respective storing space for future use. The CPU speed will tell if the computer is faster than the cartridge or not. If the CPU is faster than the cartridge, then the cartridge will have to fill the gap with NOP before sending a valid code, or give a time waiting value to the computer to slow down its speed. If the CPU is slower or equal to the cartridge speed, then the system should bypass this adjustment. The computer type is helpful if a program runs in different types of computers; for example, with or without a mathematics coprocessor, in a PC or a MAC, etc. Finally, the device card can send a start-program code (00011 ) just to set Pointer (44) to the beginning of the program.

When the device card finishes these activities it will enable the port by taking it out of the free-port-list. The cartridge will receive No-Code (00000) in the meantime. The origin of this code is from Multiplexer 35 that enables or disables the communication lines. The first port has also the function of running a start-up operating system, in the same way that 'drive-A' does in a PC computer. The device card enables the first port (number zero) automatically at start-up (see section 8.2.1.1, The start-up operation, on page 13), but the computer's CPU will send No-Code through Code (14) anyway. The cartridge will come to life when it receives any code but No-Code (00000).

8.4.1.2. When the Computer is On

If you insert a Cartridge (40) into a Port (41) when the computer is on, the device card will also be the first to take control of the situation. The device card will do the same thing described in the previous section, with the addition that it must generate an interrupt to tell the CPU of the new cartridge.

8.4.1.3. When the Cartridge is in Action

The cartridge will receive fetch codes (with flags 00001 and without flags 00010) most of the time, right behind the No-Code. But first it must receive the start-program code (00011) to set Pointer (44) to the beginning of the program. This code can send error-message-codes in Data 1 (15) or Data 2 (16). Once the CPU sends the start-program code it can send the fetch codes to gather program information.

The CPU can ask the cartridge to report the program's name. First, the CPU must send code 01010 (report initial part of program's name) to set a pointer to the beginning of the name and get the first 4 bytes (characters) of the program's name. This code is important because it begins the retrieval from the beginning, so that you know exactly what you are getting. Then, it is time to send code 01011 (report next part of program's name) as many times as needed to get the entire program's name. These codes can receive an error-message-code in Data 1 (15).

The rest of the codes (00100, report memory, and 00101, store memory) can appear at any time.

8.4.2. The Cartridge's CPU Instruction Set

Now, because the cartridge's CPU (43) is doing some processing in the program's code, we must define an instruction set for it. This instruction set will be very short in comparison to the one of the computer's CPU. We can classify this set in the following 5 groups:

1. Conditional jumps. Only these jumps will wait for a valid flags-value in order to continue the program's execution. A fetch with flags will make the cartridge process these conditional jumps. A fetch without flags will put the cartridge in standby until the CPU issues a fetch with flags. The cartridge will process the rest of the instructions regardless of the flags' status. These jumps depend on the flags' value to decide whether to jump to the indicated address. Usually the program does a comparison before in order to do the jump. The comparison will change the flags' status and the program can decide under which conditions to do the jump. We will identify these codes using the same letters used in Assembler Languages plus a lower-case 'c' in front of the codes. For example:

| Name: | Assembler: | Cartridge: |
|---|---|---|
| jump above | JA | cJA |
| jump above or equal | JAE | cJAE |
| jump below | JB | cJB |
| jump below or equal | JBE | cJBE |
| jump equal | JE | cJE |
| jump not equal | JNE | cJNE |

There are more conditional jumps, but I hope that these are enough to understand my point. In the standby situation the cartridge will return NOP.

2. Unconditional jump. This is a jump to some part of the program without condition. The program will do the jump always. This is a way to repeat something or to go somewhere when the previous conditions did not meet. Because this instruction does not need the flags' status to decide to do the jump, both fetch codes (with and without flags) will cause the cartridge to process the jump. We can name this unconditional jump as 'cJUMP.' The cartridge can return NOP to fill the space, or it can 'fetch in advance,' foretelling the next code and returning it.

3. Subroutine calls. CALL and RET (that is, call and return) instructions deal with subroutine calls. CALL will transfer the control to a subroutine, saving the current address in the cartridge's stack, and RET will return the control to the previous caller address using the data in the stack. The stack is inside the cartridge, in the cartridge's RAM (46) memory. The cartridge will process these instructions regardless the type of fetch code. We will call these cartridge instructions cCALL and cRET.

4. Macro instructions. We can allow the definition of some macro instructions. An example of a macro instruction is the LOOP instruction. These instructions usually represent the action of several atomic instructions. The LOOP, for example, is equivalent to decrementing a register, comparing the register with zero, and jumping when the comparison is not equal. We can divide these macro instructions into two parts: a no-jump-part and a jump-part. Then, we can create an equivalent macro instruction that performs the no-jump-part and call it CLOOP. The final encoding of the program will replace each LOOP with the combination of two codes: CLOOP and cJNE, which perform the same action.

5. Stack instructions. Since the cartridge will have an internal stack, it would need a way to manipulate its data. So we will have cPUSH and cPOP. However, subroutine instructions already do a good maintenance to the stack and there is no need to manipulate the stack directly. Although, for completeness we will have these instructions.

6. Cartridge memory instructions. The cartridge will need to have access to the data inside it with a direct instruction instead of having the CPU to issue the command. This will save time and is on the background, and out of the CPU knowledge.

These instructions are basic to the cartridge. Although, as one can deduce, it could be less. The cartridge will process all these instructions internally. The cartridge will hide to the CPU any of these instructions.

In summary, see FIG. 7, when the CPU sends a fetch code it will be in the box (50). Then, the cartridge will check if the current program's code is a conditional jump or not—rhombuses (51) and (52). If it is a fetch code with valid flags and the current program's code is a conditional jump code (rhombuses (50) and (51) YES), then do boxes (54), (57), and (58). That is to check flags, do the jump, send NOP to the CPU, and wait for the next code. The cartridge must do boxes (57) and (58), if it is a fetch code without flags and the current program's code is a conditional jump code (rhombuses (50) NO, and (52) YES). That is to send NOP to the CPU and wait for the next code.

If the current program's code is not a conditional jump code (rhombuses (51) NO or (52) NO), then the cartridge must do the checking in rhombus (53); regardless of the CPU's fetch code. That is, to check if the program's current code is a cartridge's instruction-set code or not. If rhombus (53) is YES, then process the cartridge's instruction internally, send NOP to the CPU, and wait for the next code—boxes (55), (57), and (58). The cartridge's instructions could be unconditional jumps, subroutine calls, memory access, or macro instructions.

If rhombus (53) is NO, then send the program's code to the CPU and wait for the next code—boxes (56) and (58).

8.4.3. Running a Program From a Cartridge

You can run programs in the cartridge as you always do with programs in the floppy or hard disk. It will be the operating system, or file manager, that will do the job. For programmers, there are some considerations:

The cartridge will hide all reference to the program's code address. One should avoid changing the program's code when the program is running from the cartridge, or once you store the program in the cartridge on the manufacturing process.

The cartridge has an absolute memory address. That is, there is no segment-offset or page division of the

```
01 _askYN    proc    near                        ; int askYN( const char * msg ) {
02           push    BP                          ; ← prepare for parameter handling
03           mov     BP, SP                      ; ← save SP for quick return
04           dec     SP                          ; ← set space for local variable
05           dec     SP                          ;    int c;
06           mov     AX, offset DGROUP:_streams+16 ; ← set up parameters
07           push    AX                          ; ← stdout and
08           push    word ptr [BP+4]             ; ← msg for
09           cCALL   near ptr _fputs;    fputs( msg, stdout );
10           pop     CX                          ; ← clean stack parameters
11           pop     CX
12 @1@50:    cCALL   near ptr _getch         ;    do c = getch( );
                                             ; while ((c!='Y')&&(c!='y')**(c!='N')&&(c!='n'))
13           mov     word ptr [BP-2], AX
14           cmp     word ptr [BP-2], 89
15           cJE     short @1@170            ; ← comparing and 'Y'
16           cmp     word ptr [BP-2], 121
17           cJE     short @1@170            ; ← comparing for 'y'
18           cmp     word ptr [BP-2], 78
19           cJE     short@1@170             ; ← comparing for 'N'
20           cmp     word ptr [BP-2], 110
21           cJNE    short @1@50             ; ← comparing for 'n'
22 @1@170:   lea     AX, word ptr [BP-2]
23           push    AX                      ; ← insert parameter c for
24           cCALL   near ptr _puts          ;    puts((char*)(&c));
25           pop     CX                      ; ← clear stack parameter
26           cmp     word ptr [BP-2], 89
27           cJE     short @1@218            ; return ((c=='Y')||(c=='y'))? 1:0;
28           cmp     word ptr [BP-2], 121
29           cJNE    short @1@242
30 @1@218:   mov     AX, 1
31           cJUMP   short @1@266
32 @1@242:   xor     AX, AX
33 @1@266:   mov     SP, BP
34           pop     BP
35           cRET
36 _askYN    endp
``` memory address, you can imagine it as a one segment or one page type of memory.

The cartridge's data memory will behave like an extended memory. The program must tell to the CPU the cartridge's port number and identify the memory as a cartridge memory (see the CPU instruction, Cartridge memory access, on page 10), before accessing the data.

The cartridge uses its own stack to store the returning address during a subroutine call. This stack is inside the cartridge and outside the computer's memory. The program must store the subroutine parameters in the computer stack, as always.

Creating programs for the cartridge is similar to the old programming style. The only changes are to rename all jump codes, but the programming language or other utilities will do this job. Even the executable code of a program is feasible to translate because the changes are at the machine level language.

Because the cartridge has its own instruction pointer, stack, and environment, it is easier to implement a multitask execution.

8.4.4. An Example of a Program

Sometimes an example will help in understanding some abstract concepts, so here is an example of a program subroutine with all its jump-codes modified. I have written this subroutine in C programming language, then I took the assembler output of the executable code. The subroutine is a programming function that will print a message on the screen and wait for the user to type a 'y' for yes or a 'n' for no.

The programming language will resolve, at link time, the identifiers not declared in this subroutine. This way, _streams is an identifier that represents the constant value stdout. _fputs, _getch and _puts are function identifiers of the address of their respective functions in some other library.

As you can see, I have modified all jump codes and identified them with bold type. From the CPU point of view, it will receive the following codes:

```
02       push     BP
03       mov      BP, SP
04       dec      SP
05       dec      SP
06       mov      AX, offset DGROUP:_streams+16
07       push     AX
08       push     word ptr [BP+4]
   — codes from _fputs
10       pop      CX
11       pop      CX
   — codes from _getch
13       mov      word ptr [BP-2], AX
14       cmp      word ptr [BP-2], 89
16       cmp      word ptr [BP-2], 121
18       cmp      word ptr [BP-2], 78
20       cmp      word ptr [BP-2], 110
22       lea      AX, word ptr [BP-2]
23       push     AX
   — codes from _puts
25       pop      CX
26       cmp      word ptr [BP-2], 89
28       cmp      word ptr [BP-2], 121
30       mov      AX, 1
```

-continued

| 32 | xor | AX, AX |
| 33 | mov | SP, BP |
| 34 | pop | BP |

But the CPU will receive a different string of codes. It will receive codes from line 02 through 08 when the program calls the subroutine for the first time. Then, the CPU will receive NOP until the cartridge has resolved the jump instruction in line 09. Since line 09 is a call to another subroutine, the codes of that subroutine will appear next to the CPU. The program will go back from _fputs when a return code (RET) appears in the program. As you can see, some strange codes (from another subroutine) appear in the middle of this subroutine, without notice for the CPU, because the cartridge hid all jump-codes from the CPU.

When the control is back from function _fputs in line 09, the CPU continues receiving codes in lines 10 and 11. Then, another subroutine call appears in line 12, and the CPU receives NOP until the cartridge processes the jump. Line 12 is a call to function getch. After that call in line 12, the CPU receives the codes in lines 13, and 14. Then, cartridge issues NOP until it resolves the jump in line 15.Depending on the result of the comparison, the CPU will receive the code in line 16; otherwise, codes in line 22.

The codes will be different in each comparison-jump instruction. The CPU will have no problem executing these codes, but it will be very difficult to copy the program. This is because the fetched codes will reflect a different program codes (in order and length). Besides, if the cartridge executes line 15 in an unexpected way, the cartridge will repeat lines 12 through 21 (including the subroutine call to _getch in line 12) several times. The final copied program (if any) will be larger than the actual program, and will behave differently.

As seen, the changes to the actual program codes are minimum, most of the program codes will remain the same, doing the same things we expected it to do. The program stack will still be there, and the program will use it to store the function's parameters between calls. The cartridge will have processed all return address of all subroutine calls in an internal stack.

9. DESCRIPTION AND OPERATION—ALTERNATIVE EMBODIMENTS

I have described some alternative embodiments previously. Most of those embodiments are alternative ways to implement the same hardware, such as putting together the device card and the first device port, or using a cartridge as thin as a credit card. Here, I will show some new ways to use this protection technique.

9.1. Remote Execution

We can run a program that is stored outside of our computer. I call this the remote execution.

You can imagine by now that the cartridge's program will stay in the cartridge and outside the computer's hard disk or memory (RAM) or floppy disk. The computer is capable of running the program under this strange condition. The computer can run a program that is far away; for example, in the next room.

Even though this is true, there are some considerations before we can apply this theory into practice. I have designed my protection technique assuming a synchronous communication between the computer and the cartridge (parallel communication lines), so that this communication will be as efficient as possible. A remote execution, as described above, is possible only with an asynchronous type of communication (serial communication lines), such as a modem or the link between the central computer and a terminal. This type of communication can be very inefficient in time. In order to execute a program remotely, we will need a synchronous-asynchronous converter (SAC) and a converter-executor (CE).

The SAC will be dealing with communication and program processor, with hardware and software. The hardware will be like a modem on one end, and like a cartridge on the other. The modem will communicate with the CE in an asynchronous way, and probably through a telephone-like communication line. The SAC will communicate with the computer as a cartridge, giving some end-user support services. These services include telling if the communication lines are busy, or that the jump is processing at the other end at that moment, etc., so that the computer will keep the end-user informed.

The SAC will receive pieces of information from the CE. These pieces are all program codes but jump-codes. After receiving this block of data, the SAC will behave as a debugger on its way of communicating this data to the computer. Then, the SAC will wait the next block of data. The program will terminate if the end-user decides to do so, or if the computer's operating system, the SAC, the CE, or the program itself terminates the execution.

The CE is another piece of hardware that will be processing the program before sending it to the SAC. This CE is more like a cartridge that processes in advance any jump-code and isolate blocks of no-jump-codes. The CE will transmit the block of no-jump-codes when it receives the ready signal from the SAC and once it resolves the conditional jump-code. If we can keep this simple, we will have a reasonably fast execution in a remote station.

This is useful to execute programs that we can not carry with us at that moment, or programs that we are not authorized to carry. The extra time in the program's execution will become a second issue.

9.2. Internet, Intranet, WWW

When we think about the remote execution, we can think about applying it to the Internet world. Including in the SAC are a modem and modem services. This is useful for those companies that want to let the consumers execute some of their programs but do not want them to copy those programs. Probably they want to sell the program and will give the consumer an opportunity to examine the program. This is also useful for companies that want to let the consumers run a program but do not have the time to download it or the time to send it by mail. Besides, this is a fast way to update a program without sending the new version every time, and this will cut some costs.

In the Intranet world, a central computer can have computers as terminals and run programs in a controlled way. With remote execution the sensitive programs will remain in one room and users can share the program in a controlled way (each use will be recorded). Companies can buy a certain number of licenses of a program and share them in a controlled way. This technique is useful for sensitive programs or programs that use sensitive information.

In the WWW (World-Wide-Web) we can apply the above features and one more. I can think of a better identification checking device. The secrecy of the cartridge with the remote execution can give a better way of doing business in the WWW. You see, the computer will not transmit the password to a company, so that nobody can overhear the transmission and copy the digital password. The password is checked at the consumers' computer. The only things that will pass through the communication lines are the program's codes. Since the way you check your password (the procedure itself) can be different, the password remains the same, but a different program will be in the communication lines. Now, if you add this to the ability of changing your password, computer hackers will have a very hard time doing their job. This security can help with the transaction of money and sensitive procedures.

9.3. Multitask

The multitask feature is easier to implement because of the independent environment of cartridge programs. However, the multitask manager will still have to preserve the data stored in the computer's memory and the flags' status. The cartridge can work in a very independent way. The program can be set to use the minimum computer resource. The main problem of multitasking is the failure to preserve the returning address in the stack and memory managing problems. With the cartridge you will not have to worry about lack of memory in your computer, so more space is available to run more programs at the same time.

9.4. Programs

Well, no one can consider programs as alternative embodiments, but the way you program and save them in a storing device can. You will have to change the way you program some software.

1) You can find EXE (executable) type of programs stored in a floppy disk, hard disk, or CD-ROM. The Operating System needs a 'loader' to load the program into the computer memory, do some memory adjustment, resolve some address references, and do some extra adjustment (e.g., Windows type of programs) before executing the program.

When this type of programs is in the cartridge, there is no need for address references, so that the computer will bypass them. The program's code must perform any memory adjustment and other types of adjustments. The rest of the program is essentially the same, with the obvious changes in every jump code. Therefore the loader job will be much simpler. The cartridge will do most of the startup job.

2) You will also find a COM type of program in a floppy disk, etc. A loader will load this program in memory before executing it. COM programs are like memory image. That is, you do not need to do any memory adjustment nor solve any reference or make other adjustments. The loading process is faster, but the program is not very big.

This type of programs is like EXE programs from the cartridge point of view and follow the same procedure. In other words, there is no COM type programs for cartridges.

3) BIN (binary) programs are memory bit image. The computer must load these programs into its memory without any modification and execute them with a simple unconditional jump to their first code. We use this type of programs to replace an interrupt or a device driver.

A cartridge can store this type of programs in their data memory and load the program as a simple move of data. Then, the cartridge can make a jump to the first code of the program.

4) In the PC type of computers, we know a TSR program as the Terminate-and-Stay-Resident types program. These programs are always active in memory and that will awake with a simple combination of key strokes. Then, it takes the control of the computer and sends the current active program to the background. These type of programs usually change the keyboard interrupt in order to identify the key combination that orders the program to awake. However, it can awake by another interrupt or other situation.

The cartridge version of TSR programs will load a small portion of the program into the memory to be the resident part of the program, just like the BIN programs. Then, the program will change the interrupt or whatever is necessary to activate the program when the user hits the right key combination. This small resident part of the program will execute the cartridge's program with a special parameter so that the program will not load the resident part again.

5) There are also interrupt programs. These type of programs are from the PC type of computer. They are not complete programs and they do some small jobs when the computer calls an interrupt. A program can have interrupt subroutines. These subroutines are useful because the program will not call the subroutine directly, but a situation outside the program domain will generate the interrupt, e.g., a zero division is executed, or a clock device.

When several programs use interrupts, the final result will be confusing and will generate conflicting control flows. As a programmer, interrupts are not a suggested programming tool, unless you are programming a supporting software, such as Operating Systems. High end programs must avoid this type of programming.

You can include interrupts in the cartridge in several ways. The program can load the interrupt code in memory using the BIN type program strategy and then change the interrupt. Or, the interrupt code can stay in the cartridge (which is the most logical solution) and the program just loads a small portion as the TSR program.

The cartridge can introduce a 'local interrupt' concept, which will solve some inter-function call problems caused by interrupts. The local interrupt is another interrupt that behaves as an TSR program. The computer will separate a space for the local interrupts, these interrupts will behave as a function that receives the port number and the address inside the cartridge where to run the actual interrupt. When the computer calls a local interrupt the control will pass to the stated cartridge (either by port number or by name, and with some error manipulation) with the given address parameter. Then, the cartridge will call the correct interrupt even if another program has overridden the interrupt.

10. CONCLUSIONS, RAMIFICATIONS, AND SCOPE

In order to keep a reference with the claims, I must add the following. The program stored in the cartridge can be of different types, from fixed memory to a RAM with a battery, or from transistors to crystal. I will refer to all these types of memories as 'memory' to avoid talking about these ramifications. I will refer to the rest of the cartridge's elements as 'processing means' because we can have different ramifications for that too. The cartridge can have its own clock to speed up the processing job, or its own data area to store variables and work internally. It can also have two processor chips instead of one. The main idea is to get the job done. I will refer to the device card and device ports as the linking device because these devices are one of the solutions to the communication problem between the computer and the cartridge. The linking device can also be a cordless device. The program's jump-codes (and all cartridge's instruction set) will be the concealed parts of the software program because these codes will remain hidden from the outside world. The remainder of the codes are the unconcealed parts of the program.

When I came out with a program that I want to sell, the main issue was to get money in exchange of my efforts, but illegal copiers make this goal difficult. Whenever I come out with a software protection technique, I found that (1) somebody has developed that technique before, (2) there were several pitfalls of that technique, and (3) that technique needed improvements. Software hackers are more sophisticated now than ever, and in an increasing number. Most of them have a college degree. I can not fool them all, and even if I can, the disadvantages of the past protection techniques (such as time-consuming, space-consuming, and not user-friendly) are not good selling incentives.

The concept of my protection technique is to hide some of the program's code to the computer. You can not hide all the codes because the computer needs them to execute the program, but you can hide some of them in order to achieve some software protection.

This is an event driven protection technique. This means that the retrieved data can change in a different situation. The protection will be better with event-driven programs than with straight batch programs. The more conditional jump-codes the program has, the higher the degree of protection this technique will offer.

When a program reaches a good protection level, only reverse engineering or a laser cutting tool can crack the security measures. By the time they are able to copy the program, a new version of the program will appear, making the illegal procedure senseless.

The program will remain in the cartridge during its execution. This will translate in zero loading time because the computer will bypass the loading of the program into its memory. It also means that there will be more memory in the computer for the program's variables and more space in the hard disk for files. Every time you add a new cartridge to the computer, it will be like adding new resources to your computer because the previous resources will stay the same. However, the computer has magically incremented the storing space for the new program.

This protection technique uses the same computer, with the same operating system, so that other programs can run in the same system as the cartridge. There is no need for special software that the computer should load before changing execution from one program to another.

Complex programs are usually huge and a challenge to software protection techniques. Now, with a cartridge they can forget to battle with limited memory space or a limited hard disk. All they have to do is increase the cartridge capacity. Complex programs can keep their feature without sacrificing security.

Because it is more difficult to copy programs in the cartridge, the final revenue is higher. Therefore, the final gain/cost ratio is also higher. This technique is cheaper than a laser tool to make holes in a floppy disk because there is no need to buy a laser.

According to the alternative embodiments described above, the protection technique can offer new operative possibilities to the Internet, Intranet and WWW environments. This includes the remote execution feature and the multitask capability.

Some programs can actually run faster in a cartridge because of the more free RAM memory. These programs are usually high memory consumers, and they work faster when they swap memory less frequently.

Consumers will like the cartridge approach because the program will consume little computer's memory or the hard disk. The computer will still run the old software and will have the old hardware too, so that the cartridge will be just as an upgrade. The user will not have to deal with complex software installation instructions anymore, nor with backing up the program. To install the program you just need to connect the cartridge, and should you damage the cartridge the manufacturer will send you a new copy upon you sending them the original.

This protection technique is much better than the existing protection technique because of the combined advantages described above.

While my description above contains many specificities, these should not be construed as limitations on the scope of the invention, but rather as an exemplification of one preferred embodiment thereof. Many other variations are possible. For example, the number of communication lines and their purpose can vary; the elements inside each components can be different in number and functions; the device card and device port can be an integral part of the computer; the cartridge can have different elements and instruction set, including but not limited to clock device, ROM, registers, power systems, etc.; and the whole hardware can have different shape and color.

Thus the scope of the invention should be determined by the appended claims and their legal equivalents, rather than by the examples given.

I claim:

1. A method of guarding a software program from illegal copying without the use of an encryption method nor the use of password, comprising:
   (a) providing a memory which stores said software program without any encrypted form,
   (b) providing processing means which are able to conceal parts of said software program to a computer,
   (c) providing a linking device which communicates said processing means with said computer,
   (d) identifying concealed parts and unconcealed parts of said software program,
   (e) transmitting said unconcealed parts by said processing means to said computer, when said computer requests said unconcealed parts, (f) deciding, by said processing means, the order of transmission of said unconcealed parts to said computer, by processing said concealed parts, (g) repeating the transmission of said unconcealed parts by said processing means, as said processing means are able to determine by processing said concealed parts, whereby said computer will receive incomplete parts of said software program in an unspecified number and order, making said software program useless for illegal copying, and whereby said computer will run said software program in a way that a programmer has designed said software program.

2. A machine of guarding a software program from illegal copying without the use of an encryption method nor the use of password, comprising:

(a) a memory which stores said software program securely, providing physical measures to achieve such security, without the use of any encryption method, nor compression method, nor password to achieve this security, (b) processing means which will:
  (1) conceal parts of said software program to a computer, dividing said software program into concealed parts and unconcealed parts,
  (2) decide which of said unconcealed parts will be transmitted to said computer by processing said concealed parts,
  (3) transmit said unconcealed parts to said computer, as said computer requires said unconcealed parts,
  (4) define the order and repetition of said unconcealed parts to be transmitted to said computer, (c) a linking device which communicates said processing means with said computer, whereby said computer will receive incomplete parts of said software program in an unspecified number and order, making said software program useless for illegal copying, and whereby said computer will run said software program in a way that a programmer has designed said software program.

3. The machine of claim 2 wherein said memory and said processing means are grouped together into a single package, which can be shaped in many forms selected but not limited from the group consisting of cartridge, cigar-shape, paper, and credit-card-like, and could be located outside the computer as far away as in the outer space to perform a remote execution behavior.

4. The machine of claim 2 wherein said memory provides physical security measures to said software program in many ways, using a combination of techniques selected from the group consisting of tide seal, epoxy, ceramic, hardening, sealing and chemical substances.

5. The machine of claim 4 wherein said physical security measures can include said processing means to provide an integral security system.

6. The machine of claim 2 wherein said memory containing a device that comprises elements selected from the group consisting of metallic net, reflecting crystal particles, tubes, and transistors.

7. The machine of claim 2 wherein said processing means comprises a data processor chip (CPU, for Central Processing Unit), a RAM (Random-Access-Memory), a multitude of registers, and a communication bus-lines; including the optional elements of a ROM (Read-Only-Memory), a clock device, an integral modem, an independent power input and outlet, and communication lights or display.

8. The machine of claim 2 wherein said concealed parts represents said processing means instruction-set, which includes conditional and unconditional jump-codes, and subroutine, memory access, macro, stack and addressing instructions.

9. The machine of claim 2 wherein said linking device is a combination of a device card and a multitude of device ports;
  whereby more than one cartridge can be connected to said machine, therefore more than one program can be executed.

10. The machine of claim 9 wherein said device card comprises a data processing chip (CPU), a RAM, a ROM, a multitude of registers, and a communication bus-lines.

11. The machine of claim 9 wherein said device port comprises a multiplexer, communication circuitry, and a communication bus-lines, including the optional elements of an adder, a XOR (exclusive OR), and a NOR (Not-OR) chip.

* * * * *